US008150419B2

(12) United States Patent
Muhonen et al.

(10) Patent No.: US 8,150,419 B2
(45) Date of Patent: Apr. 3, 2012

(54) METHOD OF INVOKING PRIVACY ON TELECOMMUNICATIONS NETWORK

(75) Inventors: Ahti Muhonen, Hirvihaara (FI); Jan Kåll, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/250,643

(22) PCT Filed: Jan. 3, 2002

(86) PCT No.: PCT/FI02/00003
§ 371 (c)(1),
(2), (4) Date: Jul. 3, 2003

(87) PCT Pub. No.: WO02/054814
PCT Pub. Date: Jul. 11, 2002

(65) Prior Publication Data
US 2004/0058689 A1   Mar. 25, 2004

(30) Foreign Application Priority Data
Jan. 4, 2001   (FI) .................................. 20010012

(51) Int. Cl.
*H04W 24/00*   (2009.01)
(52) U.S. Cl. ................ 455/456.2; 455/456.1; 455/456.3
(58) Field of Classification Search ............... 455/404.2, 455/245.1, 456.2, 456.3, 456.5, 456.6, 401.1, 455/402.2, 411, 412.2, 414.1, 414.2, 432.1, 455/435.1, 456.1; 370/352, 353, 354, 355, 370/356
See application file for complete search history.

(56) References Cited

U.S. PATENT DOCUMENTS

| | | | |
|---|---|---|---|
| 6,167,266 A | 12/2000 | Havinis et al. | |
| 6,219,557 B1* | 4/2001 | Havinis | 455/456.4 |
| 6,311,069 B1* | 10/2001 | Havinis et al. | 455/456.4 |
| 6,377,810 B1* | 4/2002 | Geiger et al. | 455/456.2 |
| 6,424,718 B1 | 7/2002 | Holloway | |
| 6,463,288 B1* | 10/2002 | Havinis et al. | 455/456.1 |
| 6,640,184 B1* | 10/2003 | Rabe | 701/207 |
| 6,662,014 B1* | 12/2003 | Walsh | 455/456.2 |
| 7,177,629 B1* | 2/2007 | Deeds | 455/415 |
| 2003/0069029 A1* | 4/2003 | Dowling et al. | 455/456 |
| 2011/0047179 A1* | 2/2011 | Enzmann et al. | 707/769 |

FOREIGN PATENT DOCUMENTS

GB   2 344 024   5/2000
(Continued)

OTHER PUBLICATIONS

Japanese Office action for corresponding JP App. No. 2007-324904 dated Nov. 2, 2010, pp. 1-5.
(Continued)

*Primary Examiner* — Jean Gelin
(74) *Attorney, Agent, or Firm* — Ditthavong Mori & Steiner, P.C.

(57) ABSTRACT

A manner of invoking privacy related to user equipment in a telecommunications network, involving sending a location service request from a location service client to a location service center. The location service center sends a privacy request to the user equipment to be located, which prompts the user of the user equipment to accept or reject the specific location service request. The user equipment sends to the location service center a privacy request response. The location service center provides the location information to the requesting client if the location service request is accepted in the privacy response, and rejects the location service request otherwise.

14 Claims, 2 Drawing Sheets

FOREIGN PATENT DOCUMENTS

| | | |
|---|---|---|
| JP | 06-189359 | 7/1994 |
| JP | 6-189359 A | 7/1994 |
| WO | WO 98 52379 A1 | 11/1998 |
| WO | WO 99/55114 | 10/1999 |
| WO | WO 99/55115 | 10/1999 |
| WO | WO 00/25545 | 5/2000 |

OTHER PUBLICATIONS

Chinese Office Action for corresponding Application No. 2006101318905, Oct. 30, 2009, China.

Chinese Office action for corresponding CN App. No. 200610131890.5 dated Mar. 30, 2010, pp. 1-6.

Chinese Office action for corresponding CN App. No. 200610131890.5 dated May 8, 2009, pp. 1-7.

Japanese Office action for corresponding JP App. No. 2007-324904 dated Apr. 20, 2010, pp. 1-5.

Personal Locator Services emerge, Kojima, et al., IEEE Spectrum, vol. 37, No. 2, Feb. 2000, pp. 41-48.

The Geographical Location Information System with Privacy Consideration, Watanabe et al., The Special Interest Group Notes of IPSJ, Inforamtion Processing Society of Japan, vol. 2000, No. 80, Sep. 8, 2000, pp. 19-24. Corr. to. Cite No. 4.

Chinese Office action for corresponding CN App. No. 200610131890.5 dated Aug. 11, 2010, pp. 1-8.

Japanese Office action for corresponding JP app. No. 2002-555571 dated Sep. 6, 2010, pp. 1-12.

* cited by examiner

METHOD OF INVOKING PRIVACY ON TELECOMMUNICATIONS NETWORK

FIELD OF THE INVENTION

The present invention relates to a method of invoking privacy on a telecommunications network, and more particularly to a method of invoking privacy in the packet-switched domain of a telecommunications network.

BACKGROUND OF THE INVENTION

Mobile communications systems provide mobile users with means to communicate from an arbitrary location within a Public Land based Mobile Network PLMN. Initially, mobile communications systems offered more or less the same services as do wired communications systems, i.e. voice calls, data calls and fax calls. The ever-changing location of the mobile user was not seen as a useful piece of information, which the wired communications systems cannot deliver. A more valid vision is that by making full use of the user's location information, mobile communications systems can achieve competitive advantages over wired communications systems. This information can be used for customizing certain value-added services according to the user's location. Such location-specific value-added services include localised weather forecasts, entertainment programs, timetables, navigation and locating a mobile user in an emergency. Additionally, the users location can also be used for law-enforcement purposes.

Within the context of this application, the following conventions will be used. Location management refers to the task of tracking a user equipment's location in terms of location/routing areas and cell/network element identifiers. Thus, location management is performed in any mobile communications system, and it is a necessary task for routing calls to a mobile subscriber. In contrast, location services, LCS, refer to the task of tracking a user equipment's location in terms of geographical coordinates. This task is not necessary for routing calls. Rather, it is a value-added information service, or it can be used for producing value-added services.

According to the state of the art of location services in the CS (Circuit-Switched) domain, it is possible for the network (MSC, Mobile Services Switching Centre) to request a subscriber to accept or reject that the location of the mobile telephone is revealed to an LCS Client. However, a corresponding mechanism does not yet exist in the UMTS (Universal Mobile Telecommunications System) packet-switched domain or in the GPRS (General Packet Radio Service) system.

In the circuit-switched domain MSC uses supplementary services signalling for invoking the privacy request. This is not a possible solution in the packet-switched domain, since supplementary services and corresponding signalling are not seen very useful in the packet-switched domain.

BRIEF DESCRIPTION OF THE INVENTION

It is thus an object of the present invention to provide a method and an apparatus for implementing the method so as to solve the above problem. The object of the invention is achieved by a method and an arrangement which are characterized by what is stated in the independent claims. The preferred embodiments of the invention are disclosed in the dependent claims.

The invention is based on the idea of a service centre which provides location services for clients, such as an GMLC (Gateway Mobile Location Centre) element in the packet-switched domain itself, requesting the user to accept or reject a location request, before the location determination process is started.

It is an advantage of the method and the arrangement of the invention that no modifications are needed in telecommunications network elements, such as the support nodes of GPRS. The invention needs support only from the location service centre and from the user equipment.

Another advantage of the method and the arrangement of the invention is that it is also applicable to the circuit-switched domain, e.g. in parallel with standard location service mechanisms.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 1:
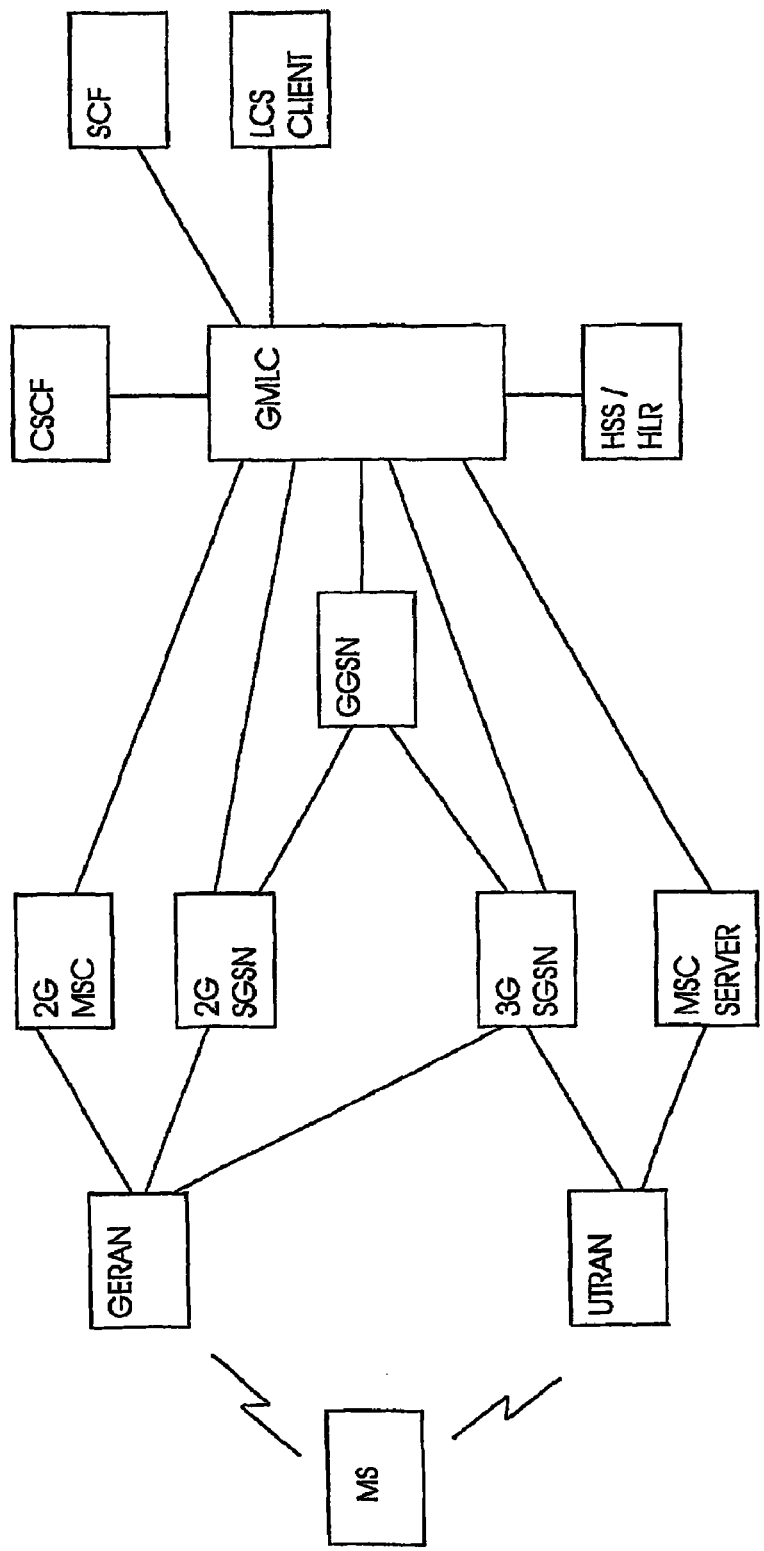
FIG. 1 presents general LCS network architecture

FIG. 1 illustrates a general LCS network architecture. GERAN (GSM, Global System for Mobile Communications, Enhanced Radio Access Network) and UTRAN (UMTS Terrestrial Radio Access Network) are taking care of radio access functionalities. MSC and SGSN (Serving GPRS Support Node) are switching entities. GMLC and LCS Client are needed to provide location based services. Apart from MLC (Mobile Location Centre), i.e. GMLC, the remaining blocks are known from prior art GSM and GPRS systems. UE (User equipment) or MS (Mobile Station) is normally a mobile phone, but it can be any entity which uses the standard air interface, e.g. a measurement unit connected to the network through the air interface.

Figure 2:
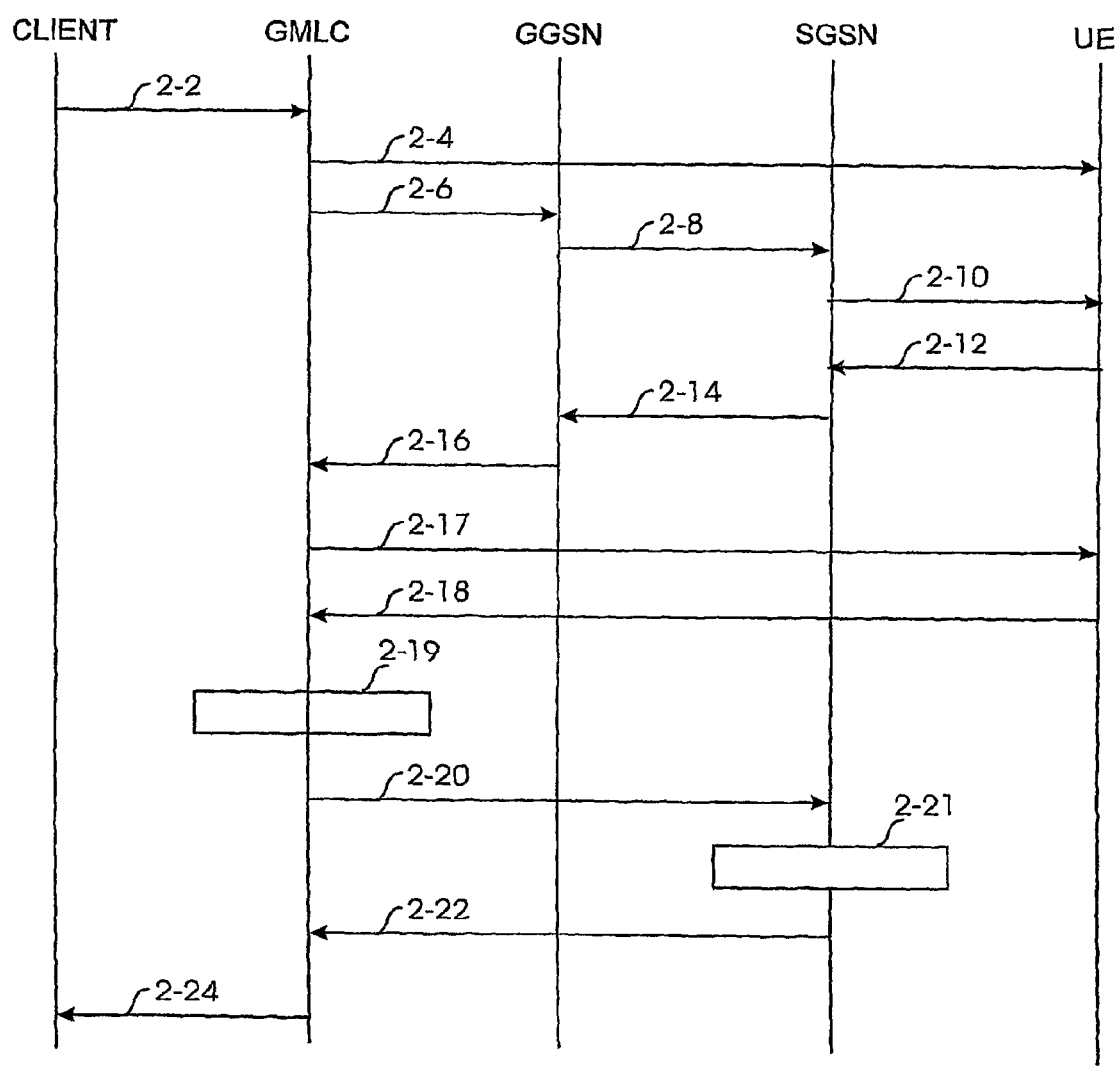
FIG. 2 shows a signalling procedure for invoking an early privacy request.

FIG. 2 illustrates a block diagram about a preferred embodiment of the invention. The invention will be described in connection with the GPRS system. However, it should be understood that the GPRS system has been chosen only for the purposes of illustration, and the invention is applicable to any telecommunications system supporting packet-switched connections and/or circuit-switched connections.

FIG. 2 shows a signalling procedure for invoking an early privacy request. In step 2-2 the LCS Client sends a location request to GMLC in order to obtain information about the current location of UE. The LCS client can be a location based application server, such as e.g. an emergency exchange or a shop in a shopping mall.

If the LCS client indicates the address of the target UE (User Equipment) in the IMSI (International Mobile Subscriber Identification) or the MSISDN (Mobile Subscriber International Integrated Services Digital Network Number) format, GMLC can use any of these in the LCS routing request to HLR. If the address of the target UE is in IP (Internet Protocol) format, GMLC must find out the mapping of this possibly dynamic IP address to IMSI or MSISDN. If the address of the target UE is a static IP address or a logical name such as name@domain.com, GMLC could obtain the corresponding MSISDN or IMSI from a special DNS (Domain Name Server) server in the backbone network.

According to the invention GMLC asks the user of the mobile terminal to accept or reject this location request from the indicated LCS client in question by sending a privacy request directly to UE. In order to do that, GMLC first has to establish a connection end-to-end with the target UE, that can be used for the privacy request signalling. GMLC sends a service request to the appropriate GGSN indicating MSISDN or IMSI or the IP address (if known) of the target UE. GGSN will process this request as a normal network-requested PDP context activation including paging and authentication of target UE, if there is no PDP established with the target UE from before. The steps from 2-6 to 2-16 are normal IP protocol and GPRS signalling steps. In steps 2-6 to 2-10 a PDP (Packet Data Protocol) activation and transport signal is proceeded from GMLC to UE via network elements GGSN and SGSN. In steps 2-12 to 2-16 data path activation is proceeded from UE to SGSN, from SGSN to GGSN and finally from GGSN to GMLC. In signalling step 2-17 GMLC sends the privacy request to UE.

In step 2-18 UE sends a privacy invocation response to the GMLC. The response indicates whether the user is willing to yield his position to the indicated LCS Client or not. In case the user declines to reveal her location information to the indicated LCS client, GMLC shall stop the location process and send a message to the LCS Client informing it about the user rejection.

In step 2-19 GMLC requests from HLR (Home location Register) the address of SGSN to which GMLC should send the location request. In step 2-20 GMLC sends a Locate UE Request to correct SGSN. According to the invention and its embodiments GMLC may add in the Locate UE Request to SGSN the information that the user has already accepted to reveal the location information to the indicated LCS client. In step 2-21 SGSN may inquire LCS subscription data regarding the target UE from HLR. HLR sends to SGSN the LCS subscription data, and the LCS subscription data may indicate whether SGSN is permitted to provide GMLC with the location information of the target UE at all or whether SGSN should first perform a privacy invocation request. If permitted, SGSN inquires the location information of the UE from the access network, BSC/SMLC in GSM or RNC in UMTS.

According to the invention and its embodiments GMLC has already informed SGSN in step 2-20 about the user permission for providing the location information to the indicated LCS Client and thus SGSN does not have to inquire that information again from UE in this case. In step 2-22 UE location information response is returned to GMLC, which in step 2-24 returns the target UE location information to the requesting entity, i.e. to the LCS Client.

In this invention GMLC could also ask HLR which privacy options are valid for the target UE. The new feature is the fact that the privacy check is made by GMLC instead of MSC or SGSN. GMLC need not perform the privacy request described here, if the subscriber data in HLR do not require that operation. The current MAP specifications do not support subscriber data transport between HLR and GMLC, and this new MAP functionality could be seen as a part of this invention. If GMLC is not able to check with HLR what the privacy options of the target UE are, it normally invokes the privacy request as described here.

In order to ensure that only an authorized GMLC and/or a GMLC known to the user is able to perform the privacy request, the signalling exchange between GMLC and the target UE may be authorized and secured. There are several possible methods to do this: IP sec, the digital signature, or Pretty Good Privacy (PGP). When PGP is used, it is assumed that the user of the target UE is aware of the encryption key used by GMLC in order to be able to decrypt the privacy request from GMLC.

Although GMLC can be in other operators' network anywhere in the world, for preventing illegal requests, a serving or a home operator may use the above-mentioned authorization and/or securing methods. If GMLC is located in the same operator's network where the user is currently served, the invention will be highly reliable from privacy perspective. However, there may be some limitations if LCS services are not available in PS side and the user is roaming. However, these limitations are minor ones compared to the advantages achieved by the invention.

As described above, the main idea of the invention is that GMLC requests itself the user to accept or reject the location request before the location determination process. The signalling between GMLC and UE has been shown to be direct. There is no need for any kind of modifications to the SGSN and GGSN. Instead modifications in the GMLC and user equipment are needed.

It should be noted that this invention is applicable also to the circuit-switched domain and can be used in parallel with the standardized solution. In the circuit-switched domain GMLC may set up a call to UE and request the user to accept or reject the location determination, using speech announcements, for instance.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising facilitating a processing of and/or processing (1) data and/or (2) information and/or (3) at least one signal, the (1) data and/or (2) information and/or (3) at least one signal based, at least in part, on the following:
    a reception of a location service request from a location service client;
    a sending, via a packet-switched network, to a user equipment to be located a privacy request prompting the user of said equipment to accept or reject the specific location service request, the privacy request being sent directly to the user equipment so that elements belonging to a group comprising a gateway support node, a service support node, a mobile switching centre, a home location register, a radio network controller, and a base station controller, are not involved in a signalling exchange of the privacy request;
    a reception, via the packet-switched network, of a privacy response; and
    a determination to provide the location information to said requesting client, if said location service request is accepted in said privacy response, and rejecting the location service request otherwise.

2. A method according to claim 1, wherein said user equipment comprises packet-mode user equipment in a packet-switched mobile communications network, and that said privacy request and said privacy response are routed from said user equipment through a gateway node and a service node of said packet-switched mobile communications network.

3. A method according to claim 2, wherein the (1) data and/or (2) information and/or (3) at least one signal are further based, at least in part, on the following:
    a determination to inform one of said service node of said packet switched network that the user has already agreed to reveal her location information to the indicated client so that said service node needs not to perform a privacy invocation with the target use equipment.

4. A method according to claim 2, wherein the (1) data and/or (2) information and/or (3) at least one signal are further based, at least in part, on the following:

a determination to inform the serving support node of said packet switched network that the user has already agreed to reveal her location information to the indicated client so the serving node needs not to perform a privacy invocation with the target user equipment.

5. A method according to claim 1 wherein the sending of said privacy request and the receipt of said privacy response are one or more of authorized and secured by any one or more of IP sec, the digital signature or Pretty Good Privacy (PGP).

6. A method according to claim 1, wherein the privacy request is sent before location determination is started.

7. A network element for providing information on the location of user equipment in a packet-switched telecommunications network in response to location service requests received from location service clients, wherein said network element is responsive to such location service request for causing, at least in part, sending to a user equipment to be located, a privacy request prompting the user of said user equipment to accept or reject the specific location service request, said network element being arranged to send the privacy request directly to the user equipment so that elements belonging to a group comprising a gateway support node, a service support node, a mobile switching centre, a home location register, a radio network controller, and a base station controller are not involved in a signalling exchange of the privacy request; and said network element is arranged to provide the location information to said requesting client responsive to a privacy response of said user equipment, if said location service request is accepted in said privacy response, and to reject said location service request otherwise.

8. A network element according to claim 7, wherein said network element is a location service centre.

9. A network element according to claim 7, wherein the privacy request is sent before location determination is started.

10. A method comprising:

receiving a privacy request at a user equipment to be located, via a packet-switched network, said privacy request prompting the user of said user equipment to accept or reject a specific location service request, wherein the privacy request is received directly from a location service centre so that elements belonging to a group comprising a gateway support node, a service support node, a mobile switching centre, a home location register, a radio network controller, and a base station controller are not involved in a signalling exchange of the privacy request;

causing at least in part, sending of a privacy response from said user equipment via the packet-switched network, to the location service center, wherein the privacy response indicates acceptance or rejection of the location service request by the user of said user equipment.

11. A method according to claim 10, wherein said privacy response is sent before location determination is started.

12. A telecommunications system comprising:

a packet-switched telecommunications network;

a location service client for sending a location service request;

a locations service centre for receiving the location service request from the location service client and in response to receiving said location service request, for causing, at least in part, sending of a privacy request to a user equipment to be located, the privacy request prompting the user of said user equipment to accept or reject the specific location service request, the location service centre being arranged to send the privacy request directly to the user equipment so that elements belonging to a group comprising a gateway support node, a service support node, a mobile switching centre, a home location register, a radio network controller, and a base station controller are not involved in a signalling exchange of the privacy request; and a user equipment for receiving the privacy request from the location service centre and in response to receiving said privacy request, for causing, at least in part, sending of a privacy response to said location service centre, wherein the location service centre is adapted to receive from said user equipment the privacy response and to provide the location information to said requesting client, if said location service request is accepted in said privacy response, and rejecting the location service request otherwise.

13. A system according to claim 12, wherein said user equipment comprises packet-mode user equipment in a packet-switched mobile communications network, and that said privacy request and said privacy response are routed between said user equipment and said location service centre through gateway and serving nodes of said packet-switched mobile communications network.

14. A telecommunications system according to claim 12, wherein the privacy request is sent before location determination is started.

\* \* \* \* \*